UNITED STATES PATENT OFFICE 2,014,801

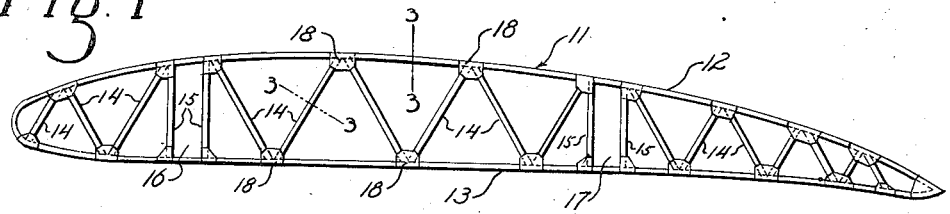
Sept. 17, 1935.     F. FLADER     2,014,801
RIB CONSTRUCTION
Filed Oct. 25, 1932     2 Sheets-Sheet 1
INVENTOR
FREDRIC FLADER
BY
ATTORNEY Sept. 17, 1935.  F. FLADER  2,014,801
RIB CONSTRUCTION
Filed Oct. 25, 1932  2 Sheets-Sheet 2
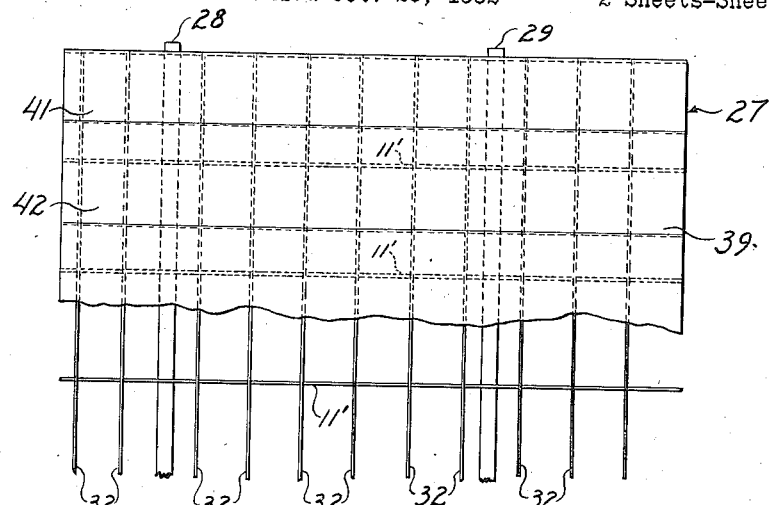
Fig. 6
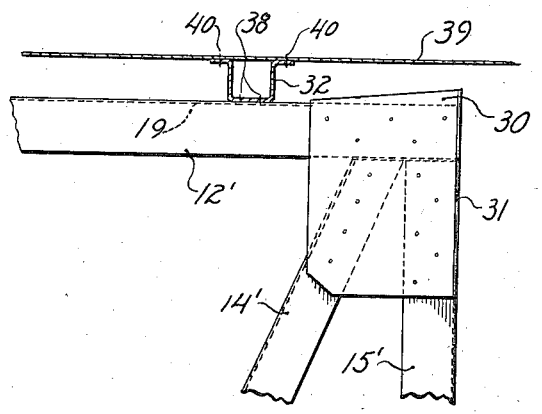
Fig. 7
Fig. 8
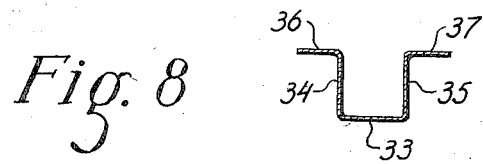
INVENTOR
FREDRIC FLADER
BY
ATTORNEY

RIB CONSTRUCTION

Fredric Flader, Buffalo, N. Y., assignor, by mesne assignments, to Curtiss Aeroplane & Motor Company, Inc., a corporation of New York Application October 25, 1932, Serial No. 639,395

2 Claims. (Cl. 244—31)

This invention relates to aircraft, and more particularly to structural members employed in the construction of aircraft wings and other such structures.

The conventional, and thus far most practical construction for airplane wings, comprises the assembly of skeleton ribs upon beams or spars extending transversely across the span of the wing. Suitable air-tight covering material is applied externally around the ribs. These ribs are necessarily made of as light construction as possible, consistent with strength. It is eminently desirable to achieve a design for wing ribs which will not only be light and strong, but will be easy to fabricate and cheap to produce. It is necessary, likewise, to construct wing ribs and other structural members of materials that will retain their original strength characteristics for long periods of time without being affected by moisture, corrosion, atmospheric conditions or reasonable degrees of heat and cold. These ideals are met to a certain degree by wood construction, but metal construction is far superior in attaining long life. Heretofore metal construction has had certain disadvantages, steel tube structures being torch welded, which process does not produce wholly determinate joints. Metal construction involving the use of duralumin, although light and strong, requires very careful heat treatment of structural members to gain full strength advantages. Duralumin cannot be effectively welded, as welding concerts the duralumin back to an unheat-treated state. Riveting duralumin requires considerable time and labor, and only freshly heat-treated rivets may be used, thus causing a certain amount of trouble and confusion in production. Both steel and duralumin are subject to corrosion, which in boat structures, particularly, is dangerous and objectionable.

A non-corrosive steel alloy, now commonly known as "stainless steel", has been found to be a highly desirable material for use in aircraft construction, as its strength to weight ratio is very high, and its non-corrosive qualities recommend it for long life and freedom from trouble in service. The use of this material for aircraft structures has brought new problems into existence, among which are the development of structural forms wherein the required stiffness of structural members can be balanced with the favorable strength to weight ratios inherent in the material. The most desirable method of developing these structural forms is to use thin sheet stainless steel, rolling the thin metal into desirable shapes to attain structural and assembling advantages. The second problem involved in the fabrication of stainless steel structures is that of fastening the members together. The fastening problem is concurrent with the development of favorable structural forms, and consists in novel welding processes which, while forming rigid and strong joints, retain the stainless qualities of the material. The structures hereinafter described are all adapted for easy assembly by welding, and it will be noted that in all joints, there is adequate open space for the insertion of the welding tool or tongs to effect the spot welding.

An object of the invention is to provide a wing or airfoil structure fabricated from formed sheet metal parts.

A further object is to provide such a structure embodying the use of ribs, skin stiffeners, and a metallic skin so organized that the strength of each named element contributes to the strength and stiffness of the structure as a whole.

A further object is to so organize the structural elements that the coordinated strength of the whole assembly allows for lightening the individual elements of the structure to a degree not realized by present methods of construction.

A further object is to provide a wing rib, all the structural elements of which are fabricated from similarly formed metallic strips.

A further object is to provide structural members of great strength and stiffness which may be produced cheaply and easily from flat strip metal.

Another object is to provide novel principles of design for structural members formed from flat sheet metal, which will generate in the formed members maximum conditions of strength and stiffness with relation to the weight of material used.

My invention comprises generally a wing or other airfoil including a pair of transverse spaced spars upon which are mounted a plurality of ribs in spaced parallel relationship, each rib extending from front to rear of the airfoil. A series of spaced parallel skin stiffening members are laid over and attached to the ribs, these stiffeners extending transversely of the airfoil and substantially parallel to the spars. The skin stiffeners are attached to each rib, so that the stiffeners at their inner surfaces abut the outer surfaces of the rib. Over the skeleton envelope thus formed by the skin stiffeners, the skin for the airfoil is laid. In the preferred form of my invention, the skin is of metal similar in nature to the metal forming the ribs and skin stiffeners, and the skin is attached to the skin stiffeners, and the stiffeners to the ribs as by spot welding. The novel features of my invention reside in the structure of the ribs individually, in the use of skin stiffeners extending transversely and superimposed upon the ribs, in the application of a metal skin to these skin stiffeners in such a manner that the skin is borne solely by the stiffeners and not by the ribs, and in the combination of the three above mentioned features as a unified wing structure. In my rib structure I provide a novel form of structural member which may be used in any and all of the various struts and chord strips which, when assembled, form the completed rib. I also provide a principle of design of the rib members, and of the skin stiffening members, whereby the ultimate in strength and stiffness is evolved for a given and limited weight of material.

In the drawings, in which similar reference characters designate similar parts:

Fig. 1 is an elevation of the wing rib constructed in accordance with my invention;

Fig. 2 is an elevation of a partial wing rib similar in its general features to the rib shown in Fig. 1, and also incorporating the skin stiffeners and wing skin;

Fig. 3 is a section on the line 3—3 of Fig. 1;

Fig. 4 is a view on the line 4—4 of Fig. 2;

Fig. 5 is a perspective view of a portion of the wing rib shown in Figs. 1 and 2;

Fig. 6 is a plan partly broken away, of a portion of a unitary wing structure embodying the features of my invention;

Fig. 7 is an enlarged view of a portion of Fig. 2 showing details of assembly of the skin stiffeners and skin; and Fig. 8 is an enlarged cross section of the skin stiffener.

At first, I will describe the construction and details of the wing rib designated in its entirety as 11, and shown principally in Fig. 1. The rib 11 is built up from an upper chord member 12, and a lower chord member 13, running continuously from front to rear or from the leading edge to the trailing edge. Between the members 12 and 13 a plurality of diagonal braces 14 are attached to form a truss structure within the rib for resisting the loads imposed on the exterior surface thereof. Vertical brace members 15 are so located as to allow apertures 16 and 17 intermediate the ends of the rib for the insertion of the wing spars, not shown in Fig. 1. Joints between the chord members 12 and 13 and the braces 14 and 15 are made by electrically spot welding gusset plates 18 on either side of the junctures of said braces and chord members.

Each and all of the chord members 12 and 13 and the braces 14 and 15 are cut from a metal strip rolled in the form of the channel shown in Fig. 3. This channel comprises a flat base face 19 with adjacent side faces 20 and 21 bent from the original flat strip so that the side faces form substantially a right angle with the base face 19 as at 22 and 23, respectively. The flat width of the faces 19, 20 and 21, in order to gain the maximum of strength and stiffness, must bear a definite and consistent relationship with the thickness of the material. It has been found by repeated tests and investigations that the preferred width for the flat faces mentioned, and for any flat and uninterrupted face of sheet metal structural members involving successive flat faces and bends, should be no greater than twenty-five times the thickness of the material. With these proportions embodied in the structural member, maximum stiffness as well as strength is produced insofar as the limitations of the metal will permit. I thereby obtain a member of high efficiency for aircraft structures in which the ratio of the strength and stiffness to weight is kept at a maximum.

In order to strengthen the side faces or flanges 20 and 21, the unsupported edge portions 24 and 26 are bent inwardly. The bent portions 24 and 26 are substantially less than half the width of the opposite face 19, and thus stiffen the side portions 20 and 21 and leave ample room for the insertion of the welding tongs within the channel. Thus, the stiffness of the flanges 20 and 21 is fully developed according to the ratio of the width of face to thickness above set forth.

Structural members in varied forms may be developed by using the above mentioned principle, in which the thickness of an unbent flat portion of a sheet metal member may bear a definite and limited ratio to the thickness of the metal, and I do not wish to limit my invention to the specific form of channel section shown, except as so limited by the appended claims.

Referring to Fig. 6, a wing designated in its entirety as 27 is made up of a forward wing spar 28 and a rear wing spar 29, extending transversely of the airfoil. The spars themselves form no part of this invention, and may be of conventional construction. Along these spars 28 and 29, ribs 11 or 11', the latter to be more fully described, are spaced in substantially parallel relationship. The rib 11', shown in Fig. 2, is substantially the same as the rib 11 shown in Fig. 1, except that it is a partial rib extending only between the spars 28 and 29. Nose portions and trailing edge portions similar generally to the nose portions and trailing edge portions of the rib 11, may be separately attached forward of the front spar and rearward of the rear spar, respectively. The rib 11' includes bracing members 14' and 15' similar to the bracing members 14 and 15 of Fig. 1. The gusset plates 30 which form the joint between the chord member 12' and the braces 15', and likewise between the chord member 13' and the braces 15', have flared end portions 31 which extend on assembly adjacent and parallel to the spars 28 and 29. Attachment of the rib 11' to the spars 28 and 29 is effected by the attachment as by welding of the flared end portions 31 of the several gusset plates 30 to the side faces of the wing spars 28 and 29.

Transversely across the spaced ribs 11', and substantially parallel to the spars 28 and 29, a series of skin stiffeners 32 are laid in spaced parallel relationship. Each skin stiffener 32 is formed, as shown in Fig. 8, as a channel member having a flat base face 33, with adjacent upstanding side portions 34 and 35. The free edges of the side portions 34 and 35 are bent outwardly to form flanges 36 and 37, respectively, which lie in a plane substantially parallel to the base face 33. The width of the faces 33, 34 and 35 are of a width of approximately twenty-five times the metal thickness, and are designed under the same principles as described for the rib member section shown in Fig. 3. As will be noted in Figs. 2 and 7, the base face 33 of the skin stiffener 32 is placed so that it lies adjacent the base face 19 of the channel section forming the chord members of the ribs 11'. Attachment of the skin stiffener 32 to the chord members 12' and 13' of the rib 11', is effected by spot welds indicated as 38. An identical system of assembly and attachment is used in the application of all other and similar skin stiffeners to the upper and lower chord members of the rib 11' and to the upper and lower chord members of the nose and trailing edge ribs extending respectively forwardly and rearwardly from the spars 28 and 29. By the assembly of a plurality of the skin stiffeners 32 upon and across a plurality of the ribs 11', the latter assembled on the spars 28 and 29, a skeleton envelope conforming in shape to the wing section is effected, and the parallel skin stiffeners thereby form a support for a metallic skin 39 which envelopes said skeleton. The skin 39, being composed of material similar to that from which the ribs and skin stiffeners are fabricated, may be attached to the skin stiffeners 32 by the identical spot welding process used for the prior made assemblies. The skin 39 lies against the outwardly facing flanges 36 and 37 of the skin stiffeners 32, and welds 40 serve to attach the skin firmly to the skin stiffeners 32. Such welds 40 are preferred at small intervals along the length of each of the flanges 36 and 37, across the whole span of the wing. It may be found desirable to assemble the skin 39 in strips running fore and aft from leading to trailing edge. Assembly, if this expedient is used, may be facilitated, since a narrow skin section as 41, shown in Fig. 6, may first be assembled across the skin stiffeners, and a second skin 42 may then be applied and may be spliced to the first skin 41 by a succession of spot welds along the edges of the lapped sheets 41 and 42. Successive strips similar to 41 and 42 may then be applied in the same manner to extend finally across the span of the wing 27, each fastened to adjacent strips and to the skin stiffeners 32. It will be noted that the skin thus applied is held away from the ribs by an amount equal to the depth of the skin stiffeners 32.

By the coordinated structure just described, it will be seen that each element of the structure contributes in some degree to the strength of the whole wing. The skin 39 finally results in a continuous sheet of metal which, by virtue of the stiffening effected by the skin stiffeners 32 of the ribs 11', serves to assume all of the drag and anti-drag stresses imposed on the wing in flight. The skin 39 in conjunction with the skin stiffeners 32, form an additional strong flange for the upper and lower chord members 12' and 13' of the ribs, and by proper calculation, it is possible to coordinate this strengthening effect with the sizes of the members making up the rib, so that these rib members may be reduced in size and still adequate strength in the whole assembly will be retained. It is likewise possible, by virtue of the skin and skin stiffeners, to coordinate their strength and stiffness with the design of the wing spars 28 and 29, whereby the strength of the whole wing may be increased or the weight decreased.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a composite wing structure of assembled metal parts, the combination of spaced transverse spars, a plurality of longitudinally extending spaced ribs, each said rib having upper and lower chord members and truss bracing therebetween, said chord members comprising channelled sheet metal strips with inwardly facing flanges, spaced transverse skin stiffeners comprising channelled sheet metal strips with outwardly facing flanges, the webs of said stiffeners being attached to the webs of said chord members whereby said stiffeners extend outwardly from said chord members, and a substantially flat sheet metal skin enveloping said skin stiffeners and attached to the flanges of said stiffeners, said skin, by the thickness of said stiffeners, being spaced from said chord members.

2. In a composite wing structure of assembled metal parts, the combination of spaced transverse spars, a plurality of longitudinally extending spaced ribs, each said rib having upper and lower chord members and truss bracing therebetween, said chord members comprising channelled sheet metal strips with inwardly facing flanges, spaced transverse skin stiffeners comprising channelled sheet metal strips with outwardly facing flanges, the webs of said stiffeners being attached to the webs of said chord members whereby said stiffeners extend outwardly from said chord members, and a plurality of substantially flat narrow skin strips extending longitudinally and externally over said stiffeners, said strips being attached to the flanges of said stiffeners, and each being attached to the edge of an adjacent strip, and said strips, by the thickness of said stiffeners, being spaced from said chord members.

FREDRIC FLADER.